May 8, 1962     T. C. RICHARDSON     3,033,165
MUZZLES FOR CARNIVOROUS ANIMALS
Filed June 24, 1960
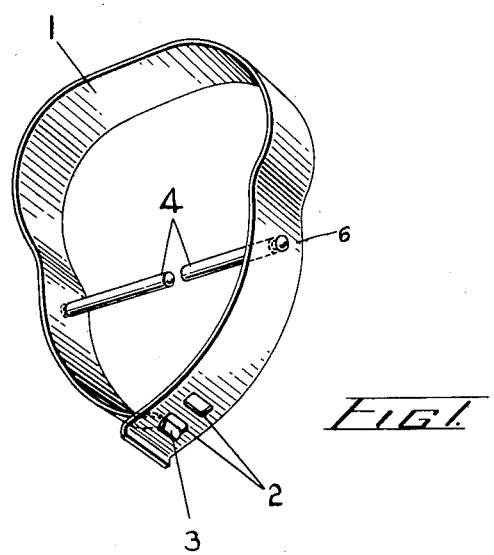
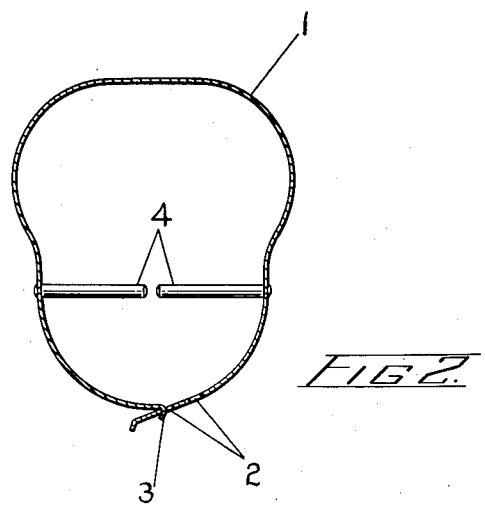
THOMAS CAMPBELL RICHARDSON
INVENTOR
George H. Riches
ATTORNEY

3,033,165
MUZZLES FOR CARNIVOROUS ANIMALS
Thomas Campbell Richardson, P.O. Box 670, 595 Garafraxa St. W., Fergus, Ontario, Canada
Filed June 24, 1960, Ser. No. 38,581
Claims priority, application Canada Sept. 12, 1959
1 Claim. (Cl. 119—130)

This invention relates to muzzles for carnivorous animals and in particular to muzzles for small animals such as ferrets, weasels and mink.

The muzzle of the prior art have particular application for dogs and their circular or almost circular shape prevents their effective use with certain active animals like mink which may easily escape from this type of muzzle. In addition, the known muzzles are usually of a multi-member construction in that there are separate means for securing or locking the muzzle in place around the animal's nose and jaws and in that the bits which engage behind the fang or tusk teeth of the animal are distinct components in the muzzle and thus require that they be positioned as a separate step in the application of these muzzles. This kind of composite construction suffers from the disadvantage of requiring at least two people apply and adjust the muzzle for proper fitting on the animal. Furthermore, muzzles of composite construction are usually expensive to fabricate and are relatively heavy when considered for use on small animals.

In the breeding of small animals generally, many animals must be equipped with muzzles. With the need for many muzzles, each muzzle should be simply and readily operable and inexpensive. Further, the shape of the muzzle must be such as to prevent its removal by the animal.

For example, in the breeding of mink, the muzzle should be as inconspicuous and light as possible. The mink, being an extremely active animal, stands in need of a muzzle having a shape which fits the contour of the animal's muzzle and lower jaw in order to prevent the animal from removing it. This is of special importance in the mating season where there is serious danger of the female mink injuring the male. On most ranches, only one attendant is available at this time and hence the muzzle must have a simple and single-piece construction to be operable by one person.

The muzzle of the present invention overcomes the above disadvantages by providing an inexpensive, simple, single-piece construction which is of inverted pear shape to fit around the muzzle and lower jaw of an animal. In particular, the band of the muzzle which fits around the muzzle and lower jaw, is made of a light-weight resilient material, such as spring steel and provided with a hook connection at its ends. With this construction, one person can operate and attach the muzzle to the animal with one hand while holding the animal with the other hand.

In the accompanying drawing which illustrates embodiments of the invention:

FIGURE 1 is a perspective view of the muzzle in the linked or fastened hereinafter called closed) position, and FIGURE 2 is a front elevation view in vertical section through the hook means of the muzzle in the closed position.

Referring to FIGURE 1, the muzzle comprises a band 1 of inverted pear shape which fits snugly around the muzzle and lower jaw of an animal and having one end with a plurality of slots 2, and the other end in the form of an integral hook 3 engageable in one of said slots. Bits 4 are securely attached to intermediate side portions 6 of the band 1 and point inwardly in a spaced relation to each other for engagement behind the tusk, fang or incisor teeth of the animal. The bits 4 are preferably in line with each other and should almost meet to hold the muzzle in place and prevent it from slipping off, while the band 1 keeps the mouth of the animal closed and assists the bits in preventing the removal of the muzzle by the animal. It is important that the bits terminate so as to leave a space between the adjacent ends so as to prevent the animal's tongue from being pinched, injured or held by the muzzle.

FIGURE 2 illustrates the shape of the band 1 in the closed position. This shape of band substantially corresponds to the contour of the animal's muzzle and lower jaw so that the muzzle will not move sideways and allow the animal to remove it.

While the foregoing illustrations show the muzzle in the closed position, that is, the position of the muzzle band when in operation on the animal, the muzzle band when not in use will expand or spread (hereinafter called open position (due to the resilient of spring property of the material. Hence, a person will have the muzzle in open position before placing and fastening the muzzle on the animal. In this way, one person can use one arm and hand for holding the animal while his other hand can be employed to place the muzzle band 1 (in open position) around the animal's muzzle and lower jaw. The sides of the band are then forced towards each other while ensuring that the bits pass into the animal's mouth and engage behind suitable teeth such as the incisor, fang or tusk teeth. When the ends of the band overlap each other, the hook 3 is slipped into one of the slots 2 so as to fasten or lock the muzzle in closed position. The muzzle can be readily and easily removed by releasing the hook attachment from the slot and allowing the muzzle bend to return to its open position.

It should be understood, that the foregoing illustrations are preferred embodiments of the invention and that the size of the muzzle and the arrangement of the components comprising it, can be varied to suit the size and kind of animal to be muzzled without departing from the scope of the invention. For instance, adjustment of the size of the muzzle can be accomplished either by means of the plurality of slots in the one end of the muzzle band or by the addition of pieces of band material in the top section of the band. The addition of pieces of band material also acts as a protection from chafing. The number of slots can be any convenient number but, generally a few slots will be found adequate. Other changes to the structure and construction of the muzzle will also become apparent from a reading of the foregoing description and therefore it is intended to claim all such changes and variations which fall within the scope of the invention in the following claim.

What I claim as new and desire to protect by Letters Patent of the United States is:

A muzzle for small carnivorous animals comprising a resilient band of inverted pear shape adapted to fit snugly around and follow the outline of the muzzle and lower jaw of an animal and having one end provided with slots and the other end formed with an integral hook releasably engagable in one of said slots, and bits attached to intermediate side portions of the band pointing inwardly in a spaced relation to each other for insertion in the mouth to engage behind certain teeth of the animal, the bits being in axial alignment with each other and terminating so as to leave a space between the adjacent ends when the muzzle is fitted over the muzzle and jaw of the animal, said resilient band being biased to expand to insure positive hooking engagement of said hook in a selected one of said slots and said band ends being located in use medially beneath the lower jaw of said animal.

References Cited in the file of this patent
UNITED STATES PATENTS
2,056,493    Streever _____ Oct. 6, 1936

FOREIGN PATENTS
3,337    Great Britain _____ Mar. 16, 1895